Sept. 7, 1948. W. A. GILE 2,448,586
TOOL HOLDER FOR LATHES
Filed March 13, 1946 2 Sheets-Sheet 1

INVENTOR.
William A. Gile
BY
Geo. A. Woodworth,
Atty.

Sept. 7, 1948.   W. A. GILE   2,448,586
TOOL HOLDER FOR LATHES
Filed March 13, 1946   2 Sheets-Sheet 2

INVENTOR.
William A. Gile
BY
Grover Woodworth
Atty.

Patented Sept. 7, 1948

2,448,586

UNITED STATES PATENT OFFICE 2,448,586

TOOLHOLDER FOR LATHES

William A. Gile, Stoneham, Mass.

Application March 13, 1946, Serial No. 654,036

2 Claims. (Cl. 29—96)

My invention relates to a tool holder for lathes, and more especially to tool holders which do not form a part of the lathe but are secured thereon by the tool post with which lathes are provided.

The principal object of my invention is to provide a tool holder whereby the position of the tool may be adjusted vertically by a construction which is extremely rugged and involves very few parts.

Other objects of the invention and the means for attaining them will be apparent from the detailed description of one embodiment of the invention which has given good results in practice.

Figure 1:
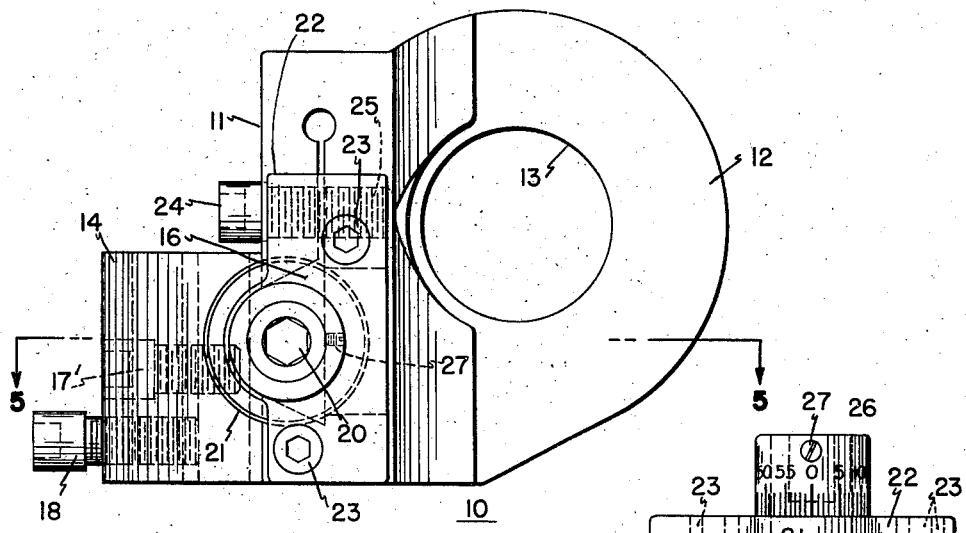
Figure 1 is a plan view of a tool holder embodying my invention.
Figure 2:
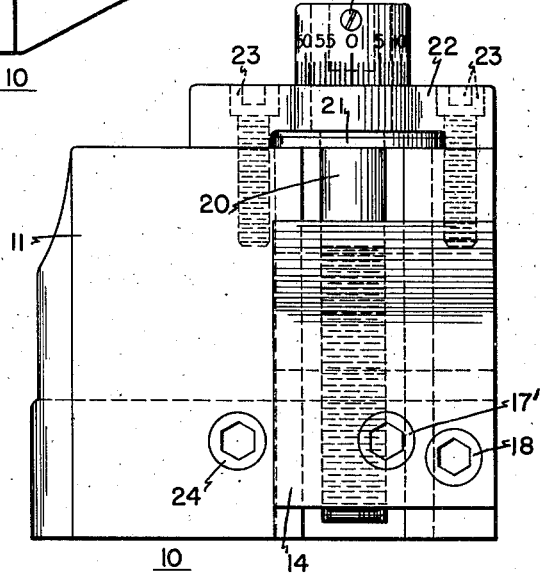
Fig. 2 is a front elevation.

In the particular drawings selected for more fully disclosing the invention, 10 is a base member having a vertical front plate 11 and a flange 12 at right angles thereto, the face-plate and flange preferably being integral, as shown.

The base member is supported on the slide rest of the lathe, the tool post passing through the aperture 13 in the flange and being secured thereto in any suitable manner. The tool-bar carrying or clamping means 14, apertured at 15 to receive the shank of the tool, is arranged to move vertically with respect to the face-plate and, in the present instance, the inner face of the clamp is provided with a tenon 16 constructed and arranged to fit snugly in the mortise 17 cut into the outer surface of the face-plate and completely fill the same, although it is to be understood that I do not limit myself to the contour of the undercut channel formed in the face-plate for receiving a reversely shaped portion of the tool of the clamping means. By making the cross sectional area of the tenon equal to that of the mortise, there is eliminated the necessity for a jib, heretofore commonly employed, between one vertical edge of the tenon and one of the vertical sides of the mortise.

Figure 3:
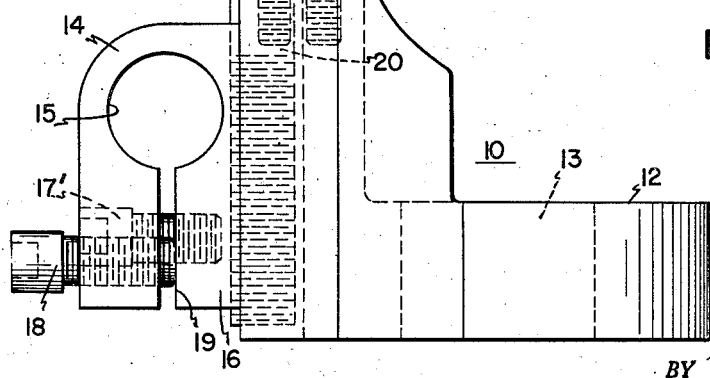
Fig. 3 is a side elevation.
Figure 4:
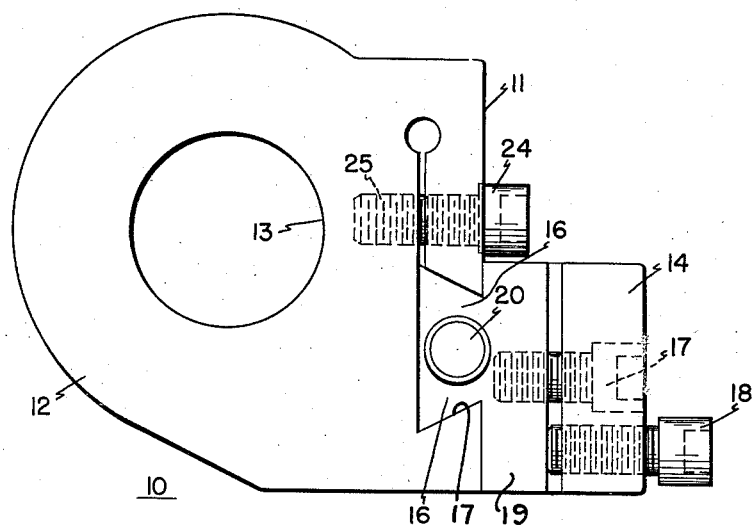
Fig. 4 is an under plan view.
Figure 5:
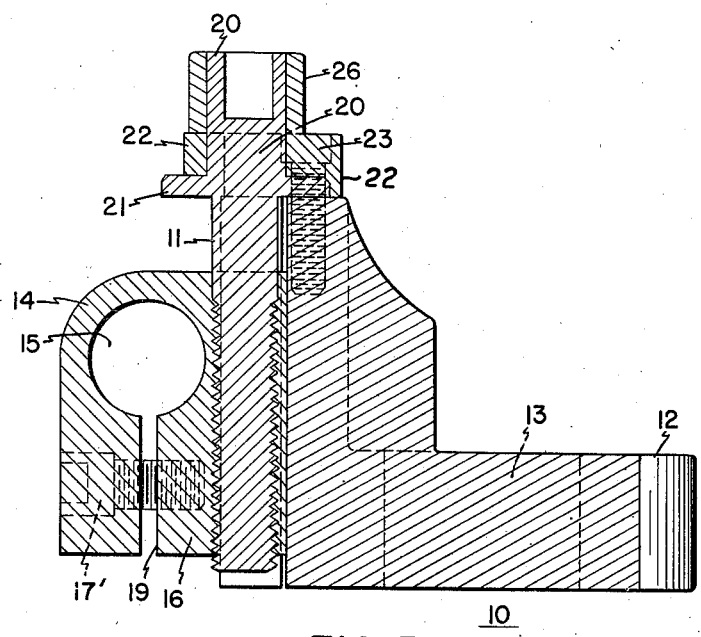
Fig. 5 is a section taken on the line 5—5 of Fig. 1.

While various means may be adopted for firmly holding the shank of the tool in the member, herein designated as a clamping means which is movable vertically with respect to the face-plate, I have found it convenient to slit the clamp vertically from the bore 15 to the lower end thereof, as indicated in Figs. 3 and 5, and to tighten the clamp on the tool shank by means of the screw 17′ which passes through the outer face of the slotted portion of the clamp and has threaded engagement with the inner portion thereof. If desired, a screw 18 having threaded engagement with the outer portion of the slotted clamp and taking against the inner portion 19 thereof, may be employed for easing the passage of a tool shank through the aperture 15, if necessary.

A screw 20 passes longitudinally through the tenon portion of the clamp and is in threaded engagement therewith. The screw is provided near its upper end with a flange 21, preferably integral therewith. For adjusting the vertical position of the clamp when the screw 20 is rotated, and to prevent axial movement of said screw in order that the rotary movement thereof will be translated into the longitudinal movement of the clamp with respect to the face-plate, any suitable means may be provided. In the present instance, the cap piece 22 secured to the top surface of the face-plate by the screws 23, 23, co-operates with the flange and the top surface of the face-plate to prevent axial movement of the flange and the screw which is integral therewith.

Means may be provided for locking the clamping means and the tool carried thereby in selected position. In the present instance, this is effected by the screw 24 which passes through the outer face of the slotted portion of the face-plate and is in threaded engagement with the inner portion thereof, as indicated at 25, the tightening of said screw causing the portion of the face-plate through which it passes, to exert a locking pressure on the tenon 16.

If desired, a graduated sleeve 26 may be secured to rotate with the screw 20 by the set screw 27 to indicate the selected position in which the tool-carrying clamp has been placed.

Having thus described an illustrative embodiment of my invention, without, however, limiting the same thereto, what I claim and desire to secure by Letters Patent is:

1. A tool holder having a base member including an upstanding face-plate provided with an approximately vertically disposed dovetail mortise, tool-bar-carrying means having a tenon snugly fitting said mortise throughout the length of the tenon, a screw in threaded engagement with said tool-bar-carrying means, a flange on said screw near the upper end thereof, and a cap piece removably secured to the top surface of said face-plate cooperating with said flange and the top surface of said face-plate to prevent axial movement of said flange and screw, whereby the rotary movement of said screw will produce movement of said tool-bar-carrying means relatively to said face plate, and means for locking said tool-bar-carrying means in selected positions.

2. A tool holder having a base member including an upstanding face plate provided with an approximately vertically disposed dove-tail mortise, tool-bar-carrying means having a tenon snugly fitting said mortise throughout the length of the tenon, said face plate being slit outwardly from the mortise to form a jaw providing one side wall of the mortise, a screw in threaded engagement with said tool-bar-carrying means, a flange on said screw near the upper end thereof, a cap piece removably secured to the top surface of said face-plate cooperating with said flange and the top surface of said face-plate to prevent axial movement of said flange and screw, whereby the rotary movement of said screw will produce vertical movement of said tool-bar-carrying means relatively to said face plate, and means for clamping said jaw against the tool-bar-carrying means to lock the latter in selected positions.

WILLIAM A. GILE.

REFERENCES CITED

The following references are of record in the file of this patent:

UNITED STATES PATENTS

| Number | Name | Date |
| --- | --- | --- |
| 1,482,916 | Dugar | Feb. 5, 1924 |
| 1,606,718 | Orup | Nov. 9, 1926 |
| 2,390,148 | Hijmans | Dec. 4, 1945 |